United States Patent

Lin et al.

[11] Patent Number: 5,917,806
[45] Date of Patent: Jun. 29, 1999

[54] METHOD AND APPARATUS FOR ADAPTIVELY BALANCING COMMUNICATION TRAFFIC IN A RADIO COMMUNICATION SYSTEM TO CONTROL CONGESTION

[75] Inventors: Jyh-Han Lin, Fort Worth; Pavan Jyotsna Achyutuni, Richland Hills; Sachin Waman Danait, Irving, all of Tex.; Samir A. Sawaya, San Diego, Calif.; Alain Charles Louis Briancon, McKinney, Tex.

[73] Assignee: Motorola, Inc., Schaumberg, Ill.

[21] Appl. No.: 08/768,763

[22] Filed: Dec. 17, 1996

[51] Int. Cl.$^6$ ........................................ H04J 3/22
[52] U.S. Cl. ........................................ 370/237; 370/253
[58] Field of Search ........................ 370/230, 236, 370/237, 329, 252, 229, 412, 465, 468, 235, 232, 233, 253, 234

[56] References Cited

U.S. PATENT DOCUMENTS

| | | | |
|---|---|---|---|
| 4,905,233 | 2/1990 | Cain et al. | 370/94.1 |
| 5,164,938 | 11/1992 | Jurkevich et al. | 370/60 |
| 5,367,523 | 11/1994 | Chang et al. | 370/84 |

Primary Examiner—Chi H. Pham
Assistant Examiner—Kim T. Nguyen
Attorney, Agent, or Firm—R Louis Breeden

[57] ABSTRACT

Traffic in a radio communication system (FIG. 1) is adaptively balanced (300) to control congestion. A congestion model is maintained (302) with congestion dependencies including first and second types of congestion along with corresponding likelihood functions that indicate a likelihood that the first type of congestion will lead to the second type of congestion. An early warning of an impending congestion is detected (304) from an incoming traffic mix which exceeds an output traffic capability, given a current output allocation and configuration. The congestion model is accessed (306), in response to detecting the impending congestion, to identify and determine a priority for possible sources of the impending congestion. Action is then taken (308, 314, 318) to relieve the impending congestion by doing at least one of (a) increasing output resources and (b) decreasing traffic rates from the possible sources, prioritized in accordance with the congestion model.

7 Claims, 3 Drawing Sheets

400

METHOD AND APPARATUS FOR ADAPTIVELY BALANCING COMMUNICATION TRAFFIC IN A RADIO COMMUNICATION SYSTEM TO CONTROL CONGESTION

FIELD OF THE INVENTION

This invention relates in general to radio communication systems, and more specifically to a method and apparatus for adaptively balancing communication traffic in a radio communication system to control congestion.

BACKGROUND OF THE INVENTION

In a mixed-protocol advanced messaging system supporting protocols such as FLEX™, ReFLEX™, InFLEXion™ voice, InFLEXion™ data, and POCSAG, the traffic mix and airtime allocation controlled by the output controller have significant impact on congestion control and traffic management. To avoid congestion under "normal" offered traffic load, the output controller needs to adaptively balance the traffic among the protocols and transmitter cells to maximize the system throughput.

To be more specific, the output controller needs to be able to detect early warnings of congestion due to a mismatch between the actual traffic mix and existing airtime allocation and cell reuse management. Then the output controller needs to balance the traffic to break the potential congestion or to control the input rates from sources when congestion develops.

Thus, what is needed is a method and apparatus for adaptively balancing communication traffic in a radio communication system to control congestion. An overall strategy for coordinating the detection of congestion and the control of traffic is needed.

SUMMARY OF THE INVENTION

An aspect of the present invention is a method for adaptively balancing communication traffic in a radio communication system to control congestion. The method comprises the steps of maintaining a congestion model comprising a plurality of congestion dependencies including first and second types of congestion along with a corresponding plurality of likelihood functions that indicate a likelihood that the first type of congestion will lead to the second type of congestion, and detecting an early warning of an impending congestion from an incoming traffic mix which exceeds an output traffic capability, given a current output allocation and configuration. The method further comprises the steps of accessing the congestion model, in response to the detecting step, to identify and determine a priority for possible sources of the impending congestion; and acting to relieve the impending congestion by doing at least one of (a) increasing output resources and (b) decreasing traffic rates from the possible sources, prioritized in accordance with the congestion model.

Another aspect of the present invention is a controller for adaptively balancing communication traffic in a radio communication system to control congestion. The controller comprises a communication interface for receiving message traffic from message originators, and an output interface coupled to the communication interface for transmitting the message traffic through output resources. The controller further comprises a processing system coupled to the communication interface and coupled to the output interface for processing the message traffic. The processing system is programmed to maintain a congestion model comprising a plurality of congestion dependencies including first and second types of congestion along with a corresponding plurality of likelihood functions that indicate a likelihood that the first type of congestion will lead to the second type of congestion, and to detect an early warning of an impending congestion from an incoming traffic mix which exceeds an output traffic capability, given a current output allocation and configuration. The processing system is further programmed to access the congestion model, in response to detecting the early warning, to identify and determine a priority for possible sources of the impending congestion; and to act to relieve the impending congestion by doing at least one of (a) increasing the output resources and (b) decreasing traffic rates from the possible sources, prioritized in accordance with the congestion model.

DETAILED DESCRIPTION OF THE DRAWINGS

Figure 1:
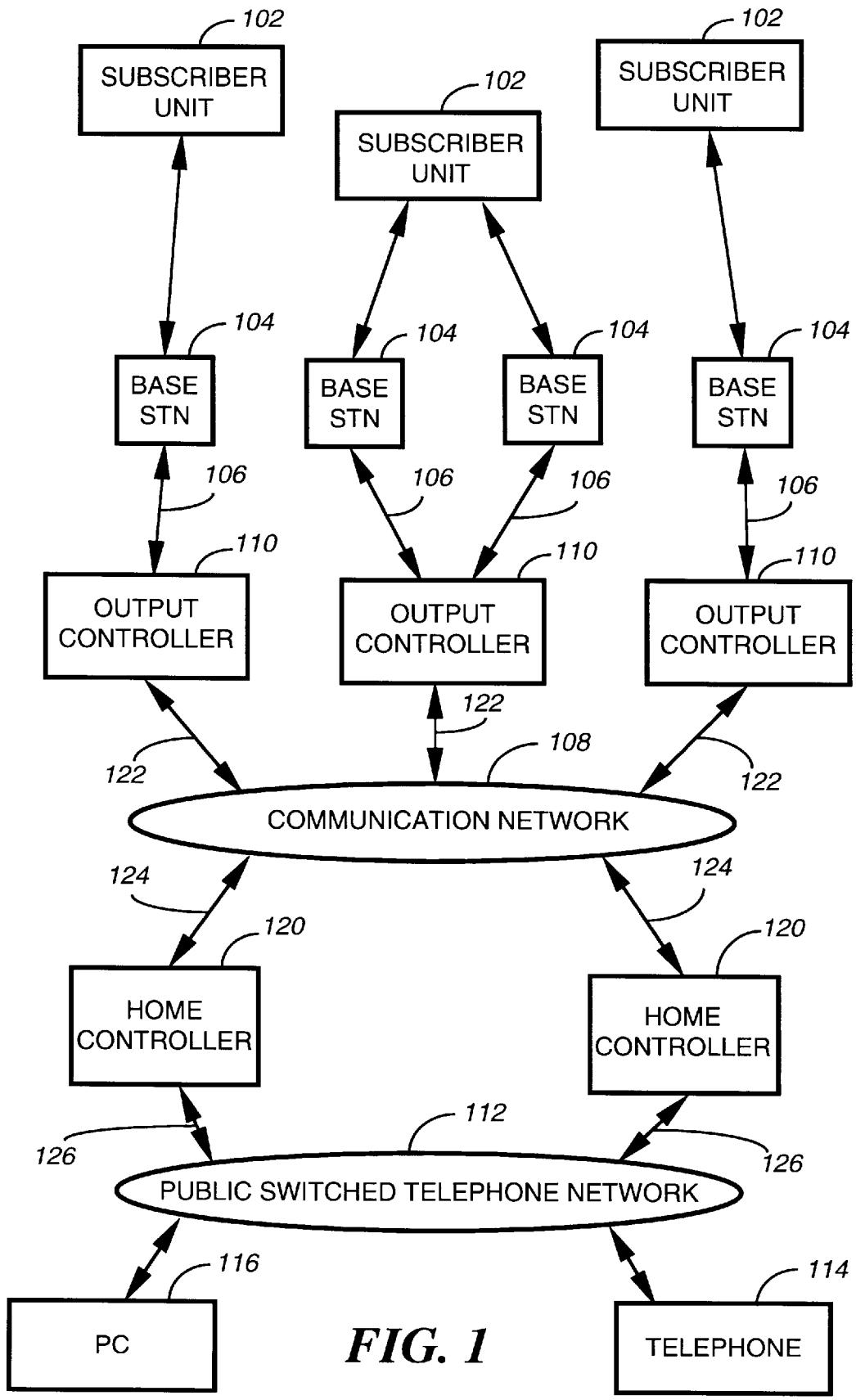
FIG. 1 is an electrical block diagram of a radio communication system in accordance with the present invention.

Referring to FIG. 1, an electrical block diagram of a radio communication system in accordance with the present invention comprises a plurality of subscriber units 102, which communicate by radio with a plurality of base stations 104 for receiving selective call messages. The base stations 104 are coupled via communication links 106 to a plurality of output controllers 110 for control thereby utilizing well-known techniques for base station control. The output controllers 110 are coupled to a plurality of home controllers 120 via communication links 122, 124, and via a conventional communication network 108 for receiving the selective call messages from the home controllers 120. The home controllers 120 and the output controllers 110 preferably communicate by utilizing a well-known protocol, e.g., the Telocator Network Paging Protocol (TNPP) or the InterPaging Networking Protocol (IPNP). The home controllers 120 are preferably coupled via telephone links 126 to a public switched telephone network 112 (PSTN) for receiving the messages from message originators utilizing, for example, a telephone 114 or a personal computer 116 to originate the messages. It will be appreciated that, alternatively, other types of communication networks, e.g., packet switched networks, local area networks, and the Internet can be utilized as well for transporting originated messages to the home controllers 120. The hardware of the home controllers 120 is preferably similar to the Wireless Messaging Gateway (WMG™) Administrator! paging terminal, while the hardware of the output controllers 110 is preferably similar to that of the RF-Conductor!™ message distributor, both manufactured by Motorola, Inc. of Schaumburg, Ill. The base stations 104 are preferably similar to the Nucleus® Orchestra! transmitter manufactured by Motorola, Inc. It will be appreciated that other similar hardware can be utilized as well for the home controllers 120, the output controllers 110, and the base stations 104. By way of example, the radio communication system depicted in FIG. 1 is a two-way radio communication system. It will be appreciated that the present invention can be applied to a one-way radio communication system as well.

The protocol utilized for transmitting the messages between the base stations 104 and the subscriber units 102 is preferably similar to Motorola's well-known FLEX™ family of digital selective call signaling protocols. These protocols utilize well-known error detection and error correction techniques and are therefore tolerant to bit errors occurring during transmission, provided that the bit errors are not too numerous in any one code word. It will be appreciated that other similar messaging protocols can be used as well.

Figure 2:
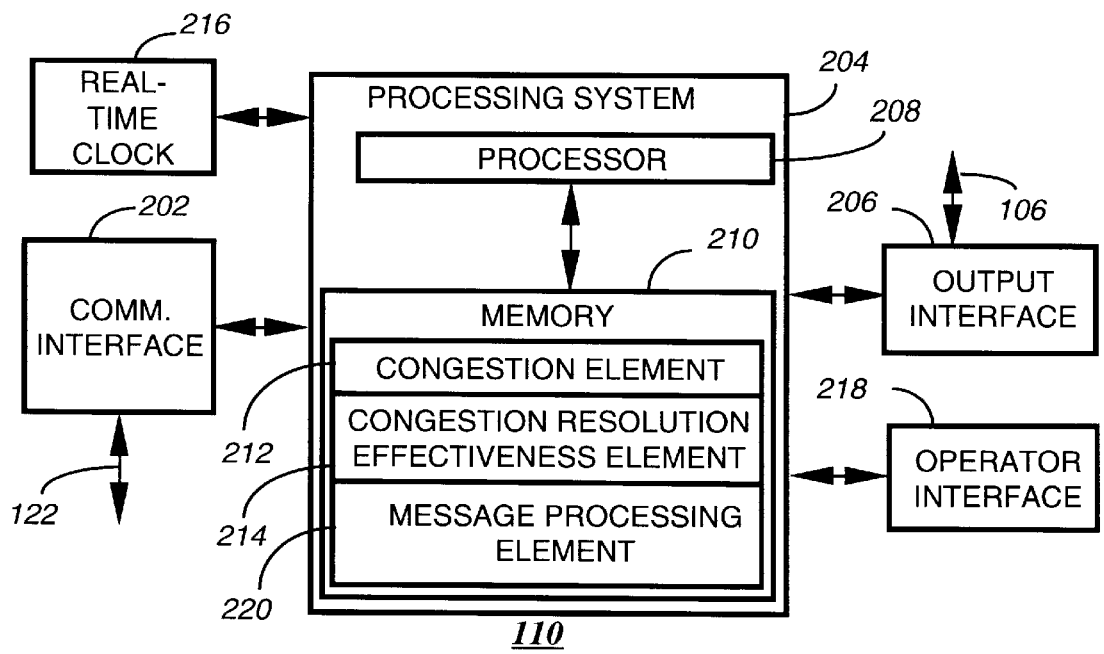
FIG. 2 is an electrical block diagram of an output controller in accordance with the present invention.

Referring to FIG. 2, an electrical block diagram of the output controller 110 in accordance with the present invention comprises a conventional communication interface 202 for receiving message traffic from message originators through the home controllers 120 via the communication link 122. The output controller 110 also includes a processing system 204 coupled to the communication interface 202 for processing communications transmitted and received through the communication interface 202. A conventional output interface 206 is also coupled to the processing system 204 for cooperating with the processing system 204 to control and communicate with the base stations 104. A conventional real-time clock 216 is coupled to the processing system 204 for providing thereto a time signal. The processing system 204 comprises a processor 208 for executing the operations of the processing system 204, and a memory 210 for storing executable software elements for programming the processor 208. The memory 210 comprises a message processing element 220 for programming the processing system 204 to process the messages handled by the output controller 110. The memory 210 further comprises a congestion element 212 and a congestion resolution effectiveness element 214 in accordance with the present invention. An operator interface 218 also is coupled to the processing system 204 for allowing an operator of the radio communication system to interface with the output controller 110. It will be appreciated that software similar to the congestion element 212 and the congestion resolution effectiveness element 214 can be placed in the home controller 120 for controlling congestion by the home controller 120 as well.

The congestion element 212 programs the processing system 204 to maintain a congestion model comprising a plurality of congestion dependencies including first and second types of congestion along with a corresponding plurality of likelihood functions that indicate a likelihood that the first type of congestion will lead to the second type of congestion. For example, congestion on an inbound radio channel from the subscriber units 102 to the base stations 104 (first type of congestion) can lead to an excessive number of retries of outbound messages, resulting in outbound channel congestion (second type of congestion).

The congestion element further programs the processing system to detect an early warning of an impending congestion from an incoming traffic mix which exceeds an output traffic capability, given a current output allocation and configuration, and to access the congestion model, in response to detecting the early warning, to identify and determine a priority for possible sources of the impending congestion, and then to act to relieve the impending congestion by doing at least one of (a) increasing output resources and (b) decreasing traffic rates from the possible sources, prioritized in accordance with the congestion model. For example, in the case of transmitter traffic congestion, the system can slow down the input rate to the congested transmitter by redirecting traffic to alternative transmitters. In other words, the system can resolve congestion by balancing transmitter traffic.

The congestion element 212 also programs the processing system 204 to increase one of the plurality of likelihood functions in response to a corresponding one of the plurality of congestion dependencies being utilized to successfully resolve the impending congestion. For example, when the redirection of traffic to alternate transmitters successfully resolves the transmitter congestion, the likelihood function in the congestion model associated with transmitter congestion caused by excessive input traffic to the transmitter is increased. The processing system 204 then uses the likelihood functions to prioritize the probable cause of the congestion.

In addition, the congestion element 212 programs the processing system 204 to control the distribution of resources by imposing limits on predetermined control parameters of objects under control, to receive feedback from the objects under control, and to adjust the limits in response to the feedback. For example, the output controller 110 can control multiple zones, channels, and base stations. The output controller 110 has to allocate resources such as memory among different zones. Inside each zone, a resource has to be shared among different channels and queues. Since not all zones and channels are equally loaded, the resource has to be distributed where it is needed most. The output controller 110 controls the distribution of resources among zones by imposing limits on control parameters such as queue size and queue growth rate. These control parameters, in turn, are adaptively adjusted using feedback from the objects that are under control. The most important types of feedback include statistics such as latency, throughput, and number of message retries.

The congestion element 212 further programs the processing system 204 to determine that a congestion which is unresolved exists in the radio communication system, and to resolve the congestion by controlling input rates of the possible sources. For example, when a sudden, prolonged burst of traffic to a zone occurs, the output controller 110 can resolve the congestion by controlling the source input rates, e.g., by limiting the number of messages accepted per unit of time. The congestion element 212 also programs the processing system 204 to utilize a multi-state congestion control strategy to actively prevent and resolve the congestion, wherein states of the strategy are entered and exited in response to severity of the congestion and expectations regarding a timely resolution of the congestion.

For example, assume that four states are defined. The four states are (1) stable, (2) stable heading for unstable, (3) unstable, and (4) unstable heading for stable. State (1) occurs when there is no indication of potential or real congestion. State (2) occurs when there are leading congestion indications. When in state (2), the output controller 110 probes the cause of the potential congestion using the congestion model and resolves the congestion by re-allocating resources, balancing traffic, or controlling the source rates. State (3) occurs when there is unresolved congestion. Preferably, by attacking potential congestion as early as possible, state (3) will not occur very often. However, a sudden and big burst of traffic, for example, to a zone or transmitter may cause this state to occur. When in this state, the output controller 110 preferably resolves the congestion by controlling the source input rates. State (4) occurs when a congestion condition exists but is improving. When in this state, the output controller 110 monitors the progress and applies more congestion resolution measures if necessary.

The congestion resolution effectiveness element 214 programs the processing system 204 to provide a congestion resolution effectiveness model comprising a plurality of actions that can be taken to resolve congestion in the radio communication system. The plurality of actions preferably include re-routing output traffic, increasing allocated output channels, and controlling source input rates. The congestion resolution effectiveness element 214 programs the processing system 204 to keep a plurality of effectiveness scores corresponding to the plurality of actions for indicating an effectiveness of an action in regard to resolving congestion, and to adjust one of the plurality of effectiveness scores based upon a result of applying a corresponding action to relieve congestion. For example, in the case of transmitter congestion, the congestion resolution effectiveness model could indicate that redirecting traffic to other transmitters scores highest in effectiveness. Next in effectiveness is increasing the number of subchannels used by the transmitter. Lowest in effectiveness is limiting the source data rate. Thus in correcting a transmitter congestion the output controller 110 would first try redirecting traffic to other transmitters, then increasing the number of subchannels, and finally limiting the source data rate. Whichever method ultimately clears the congestion has its score increased as a result of its success.

Figure 3:
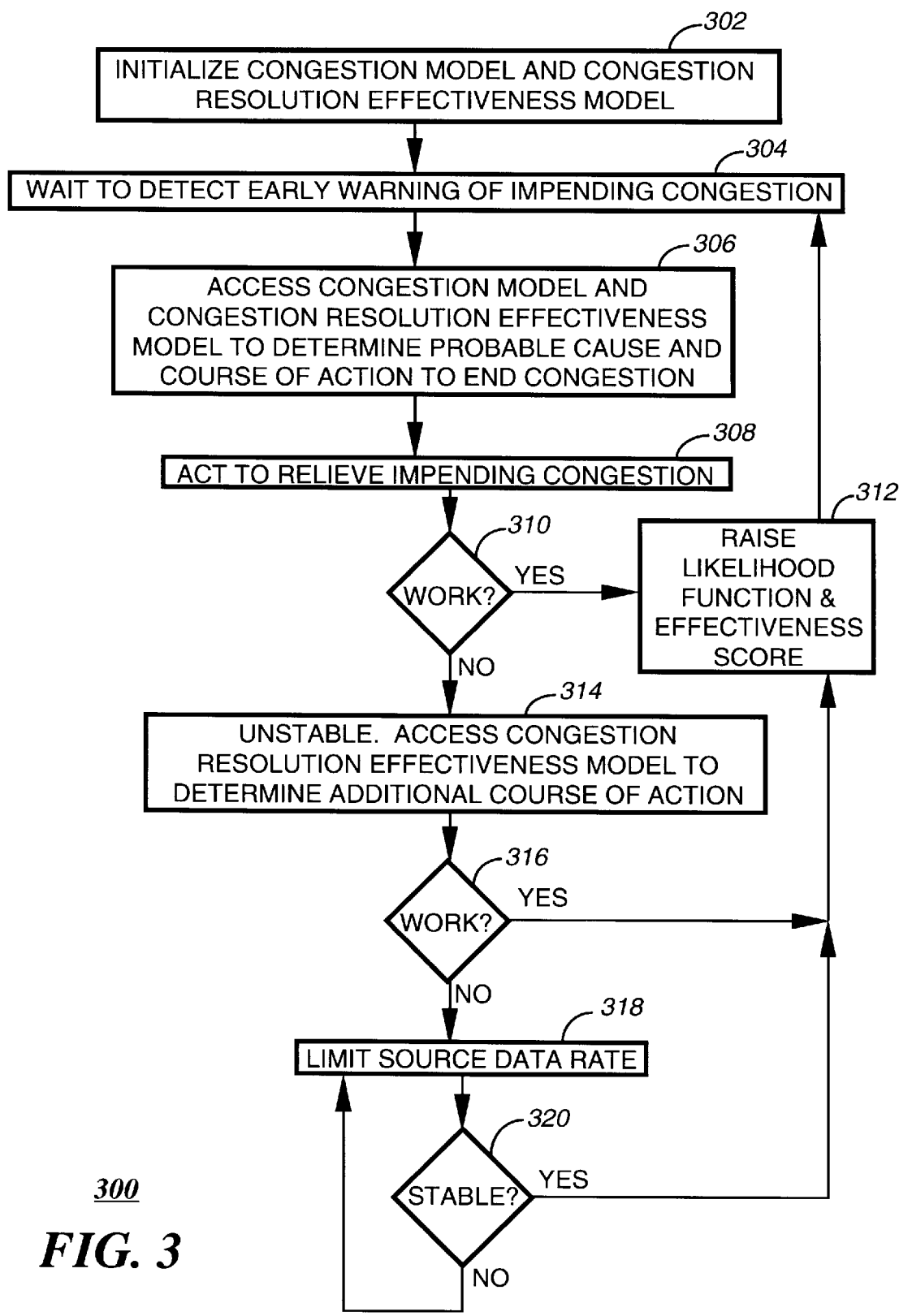
FIG. 3 is a flow chart depicting operation of the output controller in accordance with the present invention.

Referring to FIG. 3, a flow chart 300 depicts operation of the output controller 110 in accordance with the present invention. The flow chart begins with the processing system 204 initializing 302 the congestion model and the congestion resolution effectiveness model, e.g., with preprogrammed values stored in the memory 210. The processing system 204 then waits 304 to detect an early warning of impending congestion, e.g., a larger than normal outbound queue size. The processing system 204 then accesses 306 the congestion model and the congestion resolution effectiveness model maintained by the congestion element 212 and the congestion resolution effectiveness element 214 in cooperation with the processing system 204 to determine a probable cause and a course of action to end the congestion. The probable cause and course of action are prioritized from likelihood functions and resolution effectiveness scores maintained in the two models. The processing system 204 then acts 308 in accordance with the congestion model and the congestion resolution effectiveness model to relieve the impending congestion. The processing system 204 then checks 310 whether the action taken has worked to end the congestion. If so, the processing system raises 312 the likelihood function and the effectiveness score corresponding, respectively, to the cause and relief of the congestion, and then returns to step 304 to wait for another early warning of impending congestion.

If, on the other hand, in step 310 the processing system 204 determines that the action taken has not worked to end the congestion, then the congestion is unstable, and the processing system 204 again accesses 314 the congestion resolution effectiveness model to take additional action to bring the congestion under control. The processing system 204 then checks 316 whether the additional action has controlled the congestion. If so, the processing system 204 then goes to step 312 to raise 312 the likelihood function and the effectiveness score corresponding, respectively, to the cause and relief of the congestion, and then returns to step 304 to wait for another early warning of impending congestion. If, on the other hand, at step 316 the processing system 204 determines that the additional action did not resolve the congestion, then the processing system 204 limits 318 the source data rate, e.g., by accepting a limited number of message originations per unit of time. The processing system then continues 320 to limit the source data rate until the congestion is stabilized, at which time the processing system goes to step 312 to raise 312 the likelihood function and the effectiveness score corresponding, respectively, to the cause and relief of the congestion, and then returns to step 304 to wait for another early warning of impending congestion. In this manner the processing system 204 advantageously adapts the operation of the output controller to control congestion in the most effective way possible.

Figure 4:
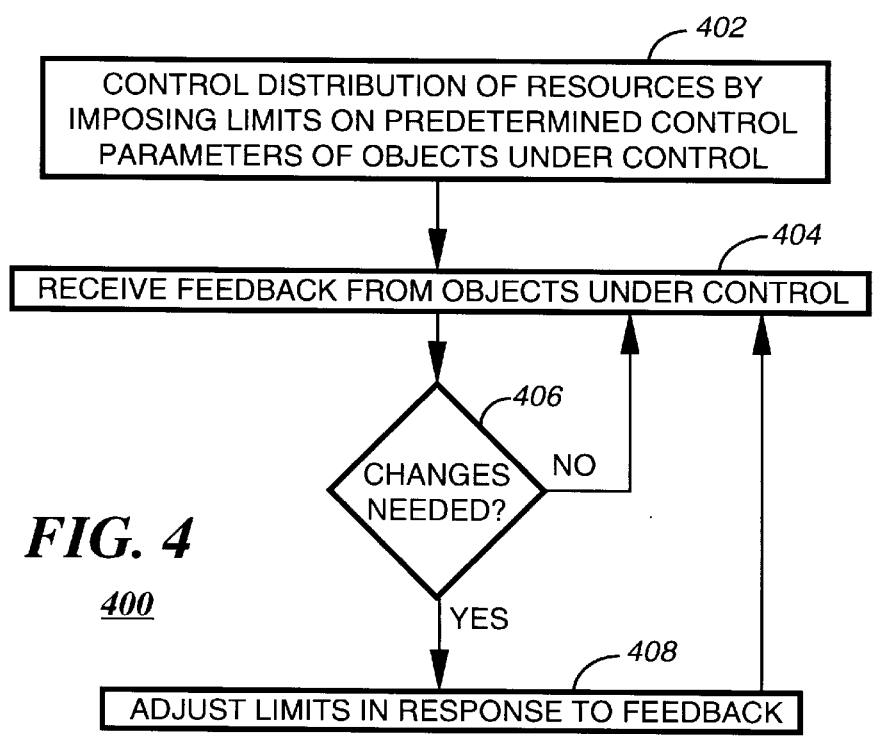
FIG. 4 is a flow chart depicting another aspect of the operation of the output controller in accordance with the present invention.

Referring to FIG. 4, a flow chart 400 depicts another aspect of the operation of the output controller 110 in accordance with the present invention. The flow chart begins with the processing system 204 controlling 402 the distribution of resources, such as memory and airtime, by imposing limits on predetermined control parameters of objects under control, such as queue sizes and queue growth rates. Then the processing system 204 receives 404 feedback, such as statistics on latency, throughput, and the number of message retries, from the objects under control. The processing system 204 then evaluates the feedback to determine 406 whether changes are needed in the imposed limits. If not, the processing system 204 merely continues to monitor and evaluate the feedback. If changes are needed, the processing system 204 then adjusts 408 the limits in response to the feedback. In this manner the output controller 110 adaptively controls the distribution of resources in an optimum way.

It should be clear by now that the present invention provides a method and apparatus for adaptively balancing communication traffic in a radio communication system to control congestion. The present invention advantageously brings an overall strategy for coordinating the detection of congestion and the control of traffic to relieve the congestion.

While the foregoing has disclosed by way of example an embodiment in accordance with the present invention, it will be appreciated that many alternative embodiments in accordance with the present invention may occur to one of ordinary skill in the art, given the teachings of this disclosure. Consequently, the scope of the invention is delimited only in accordance with the following claims.

What is claimed is:

1. A controller for adaptively balancing communication traffic in a radio communication system to control congestion, the controller comprising:

a communication interface for receiving message traffic from message originators;

an output interface coupled to the communication interface for transmitting the message traffic through output resources; and a processing system coupled to the communication interface and coupled to the output interface for processing the message traffic, wherein the processing system is programmed to:

maintain a congestion model comprising a plurality of congestion dependencies including first and second types of congestion along with a corresponding plurality of likelihood functions that indicate a likelihood that the first type of congestion will lead to the second type of congestion;

detect an early warning of an impending congestion from an incoming traffic mix which exceeds an output traffic capability, given a current output allocation and configuration;

access the congestion model, in response to detecting the early warning, to identify and determine a priority for possible sources of the impending congestion;

act to relieve the impending congestion by doing at least one of (a) increasing output resources and (b) decreasing traffic rates from the possible sources, prioritized in accordance with the congestion model;

provide a congestion resolution effectiveness model comprising a plurality of actions that can be taken to resolve congestion in the radio communication system; and keep a plurality of effectiveness scores corresponding to the plurality of actions for indicating an effectiveness of an action in regard to resolving congestion.

2. The controller of claim 1, wherein the processing system is further programmed to increase one of the plurality of likelihood functions in response to a corresponding one of the plurality of congestion dependencies being utilized to successfully resolve the impending congestion.

3. The controller of claim 1, wherein the processing system is further programmed to:

control distribution of resources by imposing limits on predetermined control parameters of objects under control;

receive feedback from the objects under control; and adjust the limits in response to the feedback.

4. The controller of claim 1, wherein the processing system is further programmed to:

determine that a congestion which is unresolved exists in the radio communication system; and resolve the congestion by controlling input rates of the possible sources.

5. The controller of claim 1, wherein the processing system is further programmed to utilize a multi-state congestion control strategy to actively prevent and resolve the congestion, and wherein states of the strategy are entered and exited in response to severity of the congestion and expectations regarding a timely resolution of the congestion.

6. The controller of claim 1, wherein the plurality of actions comprise re-routing output traffic, increasing allocated output channels, and controlling source input rates.

7. The controller of claim 1, wherein the processing system is further programmed to adjust one of the plurality of effectiveness scores based upon a result of applying a corresponding action to relieve congestion.

* * * * *